United States Patent
Kim

(10) Patent No.: US 9,593,633 B1
(45) Date of Patent: Mar. 14, 2017

(54) COMBUSTION PRE-CHAMBER AND METHOD FOR OPERATING SAME

(71) Applicant: Caterpillar Inc., Peoria, IL (US)

(72) Inventor: Charlie Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/855,613

(22) Filed: Sep. 16, 2015

(51) Int. Cl.
| | |
|---|---|
| F02D 41/00 | (2006.01) |
| F02D 41/26 | (2006.01) |
| F02D 41/24 | (2006.01) |
| F02B 19/10 | (2006.01) |
| F02B 19/12 | (2006.01) |
| F02D 35/02 | (2006.01) |

(52) U.S. Cl.
CPC ...... F02D 41/0077 (2013.01); F02B 19/1023 (2013.01); F02B 19/12 (2013.01); F02D 35/027 (2013.01); F02D 41/2406 (2013.01); F02D 41/26 (2013.01); F02M 26/41 (2016.02); F02M 26/53 (2016.02)

(58) Field of Classification Search
CPC .. F02D 41/0044; F02D 41/2406; F02D 41/26; F02D 35/027; F02B 19/1023; F02B 19/109; F02B 19/1095; F02B 19/12; F02M 26/05; F02M 26/10; F02M 26/21; F02M 26/41; F02M 26/53; Y02T 10/125
USPC ....... 701/102–104, 106, 108, 115; 123/48 R, 123/51 BC, 568.11, 568.13, 568.14, 123/568.17
See application file for complete search history.

(56) References Cited

U.S. PATENT DOCUMENTS

| | | | |
|---|---|---|---|
| 3,941,105 | A | 3/1976 | Yagi et al. |
| 4,020,808 | A | 5/1977 | Yagi et al. |
| 4,193,382 | A | 3/1980 | Oshima |
| 5,081,969 | A | 1/1992 | Long, III |
| 5,611,307 | A | 3/1997 | Watson |

(Continued)

FOREIGN PATENT DOCUMENTS

| | | |
|---|---|---|
| DE | 102005041483 A1 | 3/2007 |
| EP | 2700796 A1 | 2/2014 |
| JP | 2003254063 A | 9/2003 |

OTHER PUBLICATIONS

Egils A. Purins, "Pre-Chamber Stratified Charge Engine Combustion Studies," Ford Motor Company, SAE International, May 29, 2015.

*Primary Examiner* — John Kwon
*Assistant Examiner* — Johnny H Hoang
(74) *Attorney, Agent, or Firm* — Baker Hostetler

(57) ABSTRACT

An internal combustion engine includes a pre-chamber assembly including a wall having an internal surface opposite an external surface, the internal surface of the wall defining a combustion pre-chamber and at least one orifice extending to an aperture through the external surface of the wall; a block having an internal surface defining a bore therein; a piston disposed within the bore and configured for reciprocal translation within the bore, the piston, the bore, and the external surface of the wall at least partly defining a main combustion chamber, and the combustion pre-chamber being in fluid communication with the main combustion chamber via the at least one orifice; an energy source operatively coupled to the combustion pre-chamber; and an exhaust gas recirculation (EGR) valve fluidly coupled to the combustion pre-chamber and an exhaust conduit of the internal combustion engine.

20 Claims, 7 Drawing Sheets

(56) References Cited

U.S. PATENT DOCUMENTS

| | | | |
|---|---|---|---|
| 5,918,577 A | 7/1999 | Martelli et al. | |
| 6,739,289 B2 | 5/2004 | Hiltner et al. | |
| 7,261,097 B2 | 8/2007 | Gong et al. | |
| 7,278,387 B2 | 10/2007 | Gong et al. | |
| 7,493,886 B2 | 2/2009 | Blank | |
| 7,832,372 B2 | 11/2010 | Blank | |
| 8,365,689 B2 | 2/2013 | Gruber et al. | |
| 8,443,716 B2 | 5/2013 | Keller | |
| 8,567,369 B2 | 10/2013 | Johnson | |
| 2012/0060791 A1 | 3/2012 | Woerner et al. | |
| 2013/0263820 A1 | 10/2013 | Yu et al. | |
| 2014/0209057 A1 | 7/2014 | Pouring et al. | |
| 2015/0068489 A1* | 3/2015 | Bunce | F02B 19/1057 123/262 |
| 2016/0230645 A1* | 8/2016 | Schock | F02B 19/12 |

\* cited by examiner

COMBUSTION PRE-CHAMBER AND METHOD FOR OPERATING SAME

TECHNICAL FIELD

The present disclosure relates generally to reciprocating internal combustion engines and, more particularly, to a combustion pre-chamber for an internal combustion engine and a method for operating the same.

BACKGROUND

Reciprocating internal combustion (IC) engines are known for converting chemical energy from a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy in the mixture into heat. In turn, expansion of the combustion products within the variable volume performs work on the piston, which may be transferred to an output shaft of the IC engine.

Some constituents in the exhaust stream from an IC engine, such as, for example, nitrogen oxides (NOx), unburned hydrocarbons (UHCs), and particulate matter (PM), may be subject to government regulations. Accordingly, operators may wish to control concentrations of regulated exhaust constituents released to the environment. The composition of exhaust discharged from an IC engine may be affected by control of the combustion process within the variable volume combustion chamber, exhaust aftertreatment downstream of the combustion chamber, or combinations thereof.

Some IC engines employ an externally-powered ignition source to initiate combustion of the fuel-oxidizer mixture within the variable volume. For example, an IC engine may include a spark plug defining a spark gap between an anode and a cathode, where the spark gap is in fluid communication with the variable volume and in electrical communication with an electric potential. Accordingly, applying the electric potential across the spark gap may cause an electric spark to arc across the spark gap, thereby initiating combustion of the fuel-oxidizer mixture within the variable volume.

Further, recirculation of exhaust gas from the exhaust of an IC engine back to the inlet of the IC engine is known. The recirculated exhaust gas flow may be mixed with a fresh oxidizer flow to vary an oxygen concentration of the oxidizer mixture entering the combustion chamber, a temperature of the oxidizer mixture entering the combustion chamber, or both.

U.S. Pat. No. 3,941,105 ("the '105 patent"), entitled "Exhaust Gas Recirculation for Three-Valve Engine," purports to address the problem of reducing the amount of nitrogen oxides in the engine exhaust gases discharged to the atmosphere. The '105 patent describes an internal combustion piston engine of the spark-ignition type having a main combustion chamber and an auxiliary combustion chamber connected through a torch nozzle restriction. The auxiliary combustion chamber of the '105 patent is fluidly coupled to an exhaust chamber via a valve.

According to the '105 patent, a rich mixture is ignited in the auxiliary combustion chamber to project a flame through the torch nozzle restriction to ignite a lean mixture in the main combustion chamber. However, ignition of a rich mixture in the auxiliary combustion chamber may not satisfy the needs for emissions control and combustion control in some applications. Furthermore, the '105 patent does not provide guidance on how to operate the internal combustion engine by igniting a lean mixture in the auxiliary combustion chamber.

Accordingly, there is a need for improved ignition apparatus and methods for reciprocating IC engines to address the aforementioned problems and/or other problems in the art.

It will be appreciated that this background description has been created to aid the reader, and is not to be taken as a concession that any of the indicated problems were themselves known previously in the art.

SUMMARY

According to an aspect of the disclosure, an internal combustion engine comprises a pre-chamber assembly including a wall having an internal surface opposite an external surface, the internal surface of the wall defining a combustion pre-chamber and at least one orifice extending to an aperture through the external surface of the wall; a block having an internal surface defining a bore therein; a piston disposed within the bore and configured for reciprocal translation within the bore, the piston, the bore, and the external surface of the wall at least partly defining a main combustion chamber, and the combustion pre-chamber being in fluid communication with the main combustion chamber via the at least one orifice; an energy source operatively coupled to the combustion pre-chamber; an exhaust gas recirculation (EGR) valve fluidly coupled to the combustion pre-chamber and an exhaust conduit of the internal combustion engine; and a controller operatively coupled to the energy source and the EGR valve. The controller is configured to admit a flow of exhaust gas into the combustion pre-chamber along a flow path that does not include the main combustion chamber, effect a plurality of energy pulses from the energy source within the combustion pre-chamber during one cycle of the piston reciprocating within the bore, and increase a concentration of at least one of diatomic hydrogen (H2) and carbon monoxide (CO) within a mixture of a fuel and an oxidizer disposed within the combustion pre-chamber in response to a first energy pulse of the plurality of energy pulses.

An aspect of the disclosure provides a method for operating an internal combustion engine. The internal combustion engine includes a pre-chamber assembly including a wall having an internal surface opposite an external surface, the internal surface of the wall defining a combustion pre-chamber and at least one orifice extending to an aperture through the external surface of the wall; and a piston disposed within a bore and configured for reciprocal translation within the bore, the piston, the bore, and the external surface of the wall at least partly defining a main combustion chamber, and the combustion pre-chamber being in fluid communication with the main combustion chamber via the at least one orifice. The method comprises introducing a flow of exhaust gas into the combustion pre-chamber along a flow path that does not include the main combustion chamber; effecting a plurality of energy pulses within the combustion pre-chamber from an energy source during one cycle of the piston reciprocating within the bore; and increasing a concentration of at least one of diatomic hydrogen (H2) and carbon monoxide (CO) within a mixture of a fuel and an oxidizer disposed within the combustion pre-chamber in response to a first energy pulse of the plurality of energy pulses.

According to an aspect of the disclosure, an article of manufacture comprises non-transitory machine-readable media encoding instructions thereon for causing a processor to deliver a flow of exhaust gas to a combustion pre-chamber along a flow path that does not include a main combustion chamber; effect a plurality of energy pulses within the combustion pre-chamber of an internal combustion engine during one cycle of a piston reciprocating within a bore of the internal combustion engine; and increase a concentration of at least one of diatomic hydrogen (H2) and carbon monoxide (CO) within a mixture of a fuel and an oxidizer disposed within the combustion pre-chamber in response to a first energy pulse of the plurality of energy pulses.

DETAILED DESCRIPTION

Aspects of the disclosure will now be described in detail with reference to the drawings, wherein like reference numbers refer to like elements throughout, unless specified otherwise.

Figure 1:
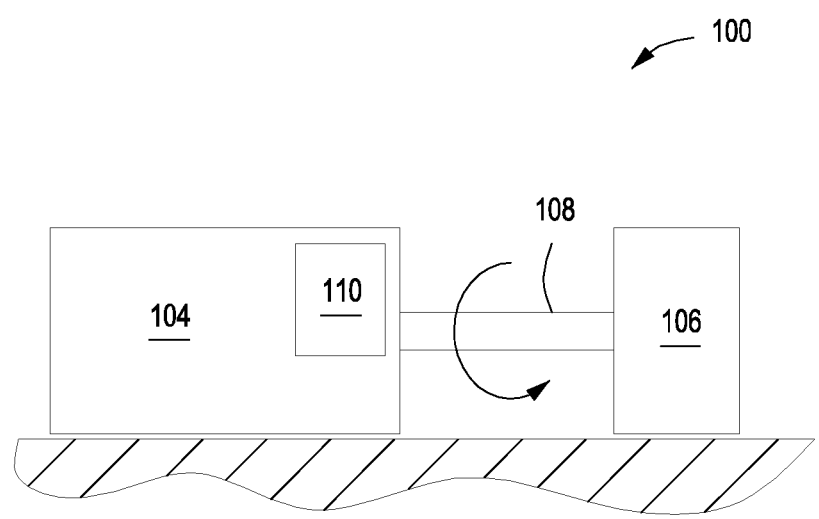
FIG. 1 shows a schematic view of a machine, according to an aspect of the disclosure.

FIG. 1 shows a schematic view of a machine 100, according to an aspect of the disclosure. The machine 100 includes an internal combustion (IC) engine 104 that is operatively coupled to a load 106 via a shaft 108. The IC engine 104 may be a reciprocating internal combustion engine, such as a compression ignition engine or a spark ignition engine, for example. The load 106 may include an electric generator, a compressor, a pump, or combinations thereof. Alternatively or additionally, the load 106 may include a work implement, such as a dump bed, a shovel, a drill, a fork lift, a feller buncher, a conveyor, or any other implement known in the art for performing work on a load.

The machine 100 includes a controller 110 operatively coupled to the IC engine 104 for control thereof. It will be appreciated that the controller 110 may effect open-loop or closed-loop control actions based on inputs from operator input devices, sensors, operating maps stored therein, combinations thereof, or any other control inputs known in the art.

The machine 100 can be an over-the-road vehicle such as a truck used in transportation or may be any other type of machine that performs some type of operation associated with an industry such as mining, construction, farming, transportation, or any other industry known in the art. For example, the machine 100 may be an off-highway truck, an on-highway truck, a railway locomotive, a marine vehicle, an earth-moving machine, such as a wheel loader, an excavator, a dump truck, a backhoe, a motor grader, a material handler, or the like. The term "machine" can also refer to stationary equipment such as a generator that is driven by the IC engine 104 to generate electricity, a pump or compressor that is driven by the IC engine 104, or any other stationary drive equipment known in the art. The specific but non-limiting machine 100 illustrated in FIG. 1 is a stationary generator set.

Figure 2:
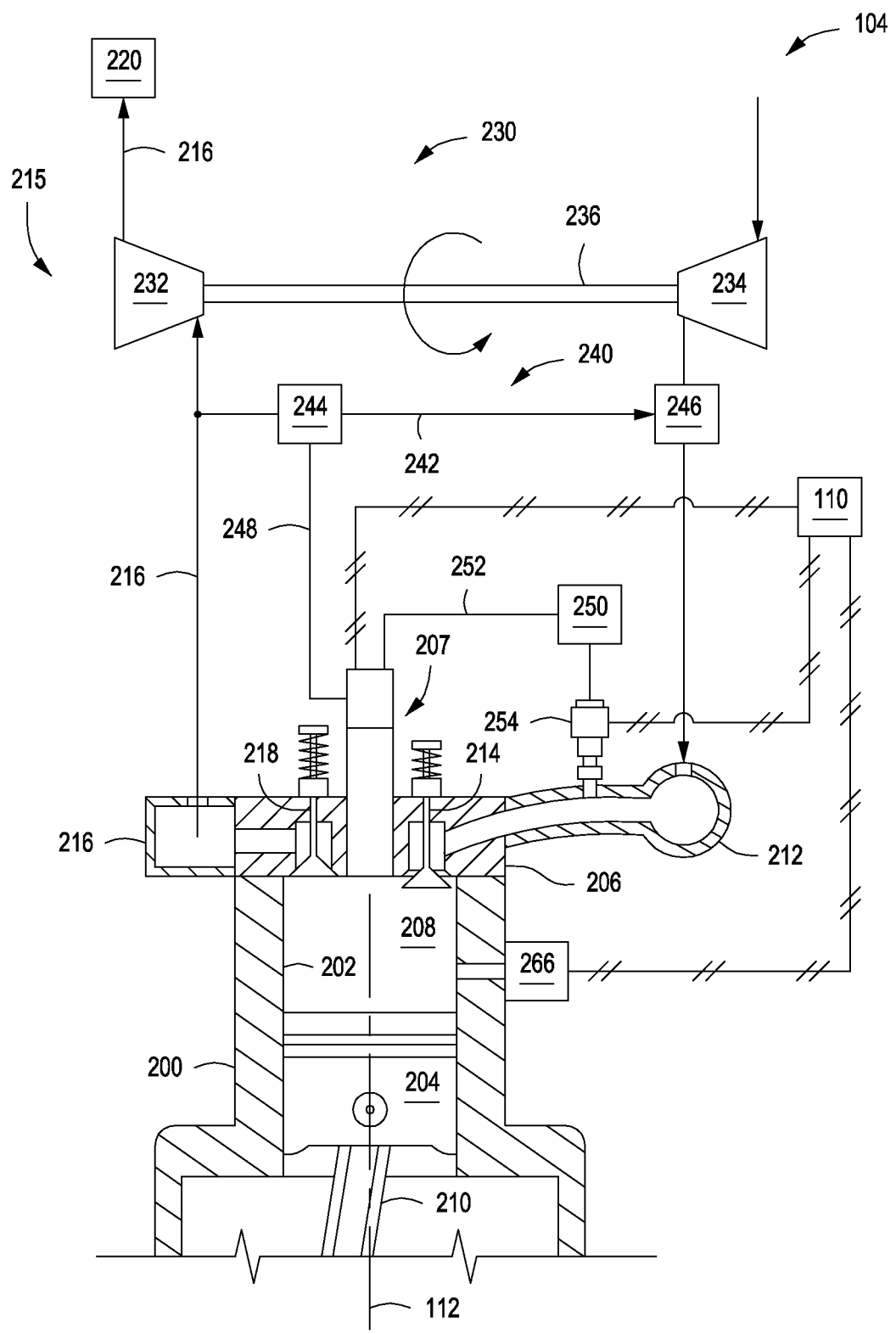
FIG. 2 shows a schematic cross-sectional view of an IC engine, according to an aspect of the disclosure.

FIG. 2 shows a schematic cross-sectional view of an IC engine 104, according to an aspect of the disclosure. The IC engine 104 includes a block 200 defining at least one cylinder bore 202 therein, at least one piston 204 disposed in sliding engagement with the cylinder bore 202, a head 206 disposed on the block 200, and a pre-chamber assembly 207. The cross section in FIG. 2 is taken along a plane including a longitudinal axis 112 centered within the bore 202.

The cylinder bore 202, the piston 204, the head 206, and the pre-chamber assembly 207 define, at least partly, a main combustion chamber 208. A volume of the main combustion chamber 208 may vary with the location of the piston 204 relative to the head 206, such that the volume of the main combustion chamber 208 is at a maximum when the piston 204 is located at Bottom Dead Center (BDC) of its stroke, and the volume of the main combustion chamber 208 is at a minimum when the piston 204 is located at Top Dead Center (TDC) of its stroke.

The IC engine 104 may operate according to a four-stroke cycle, including an intake stroke (from TDC to BDC), a compression stroke (from BDC to TDC), an expansion stroke (from TDC to BDC), and an exhaust stroke (from BDC to TDC). Alternatively, the IC engine 104 may operate according to a two-stroke cycle, including a compression/exhaust stroke (from BDC to TDC) and an expansion/exhaust/intake stroke (from TDC to BDC). It will be appreciated that the IC engine 104 may also operate according to any known modifications of the four-stroke cycle or the two-stroke cycle, including, but not limited to, the Miller Cycle, for example.

The piston 204 is pivotally connected to a crankshaft via a connecting rod 210 for transmitting mechanical power therebetween. Although only one piston 204 and cylinder bore 202 are shown in FIG. 2, it will be appreciated that the IC engine 104 may be configured to include any number of pistons and cylinder bores to suit a particular design or application.

The IC engine 104 receives a flow of oxidizer from an intake duct 212. One or more intake valves 214 effect selective fluid communication between the intake duct 212 and the main combustion chamber 208. The IC engine 104 discharges a flow of exhaust to the exhaust system 215 via an exhaust duct 216. One or more exhaust valves 218 effect selective fluid communication between the main combustion chamber 208 and the exhaust duct 216. The intake valves 214 and the exhaust valves 218 may be actuated by a cam/push-rod/rocker arm assembly, a solenoid actuator, a hydraulic actuator, or by any other cylinder valve actuator known in the art to open or close intake or exhaust valves.

The exhaust system 215 may include an exhaust aftertreatment system 220 for trapping exhaust constituents, converting an exhaust constituent from one composition to another composition, or both. The exhaust aftertreatment system 220 may include a particulate filter, a nitrogen oxide (NOx) conversion module, an oxidation catalyst, an acoustic muffler, combinations thereof, or any other exhaust aftertreatment device known in the art.

Referring still to FIG. 2, the IC engine 104 may include a turbocharger 230 having a turbine 232 operably coupled to a compressor 234 via a shaft 236. The turbine 232 receives a flow of exhaust gas via the exhaust duct 216 and extracts mechanical work from the exhaust gas by expansion of the exhaust gas therethrough. The mechanical work extracted from the turbine 232 from the flow of exhaust gas is transmitted to the compressor 234 via the shaft 236. The compressor 234 receives a flow of oxidizer, such as, for example, ambient air, and performs work on the flow of oxidizer by compression thereof. The flow of compressed oxidizer is discharged from the compressor 234 into the intake duct 212.

Additionally, the IC engine 104 includes an Exhaust Gas Recirculation (EGR) loop 240 for conveying exhaust gas into the oxidizer flow. The EGR loop 240 may include an EGR conduit 242 in fluid communication with the exhaust duct 216 upstream of the turbine 232, and in fluid communication with the intake duct 212 downstream of the compressor 234, effecting a so-called "high-pressure EGR loop." Alternatively, it will be appreciated that the IC engine 104 may also be equipped with a low-pressure EGR loop, where the EGR conduit 242 is in fluid communication with the exhaust duct 216 downstream of the turbine 232, and in fluid communication with the intake duct 212 upstream of the compressor 234.

The EGR conduit 242 may incorporate an EGR conditioning module 244 that effects cooling, filtering, or throttling of exhaust gases flowing therethrough, combinations thereof, or any other exhaust gas processing known to benefit the operation of the EGR loop 240. The EGR conduit 242 may fluidly couple with the intake duct 212 at a mixing device 246 configured to effect mixing between the recirculated exhaust gas and the flow of oxidizer.

The EGR loop 240 may also include a pre-chamber EGR conduit 248 that effects fluid communication between the EGR conduit 242 and the pre-chamber assembly 207. According to an aspect of the disclosure, the pre-chamber EGR conduit 248 effects fluid communication between the EGR conditioning module 244 and the pre-chamber assembly 207. Thus, the pre-chamber EGR conduit 248 may compose part of a flow path between the exhaust duct 216 and the pre-chamber assembly 207 that does not include the intake duct 212 or the main combustion chamber 208.

The IC engine 104 receives combustible fuel from a fuel supply system 250. The fuel supply system 250 may include fuel storage, compressors, pumps, valves, regulators, instrumentation, or any other elements known in the art to be useful for supplying a flow of fuel. The pre-chamber assembly 207 is disposed in direct fluid communication with the main combustion chamber 208, and may receive a flow of fuel from the fuel supply system 250 via a pre-chamber fuel conduit 252 and a pre-chamber fuel valve 253 (see FIG. 3). Accordingly, the fuel supply system 250 may be in fluid communication with the main combustion chamber 208 via the pre-chamber assembly 207. Further, the fuel supply system 250 maybe in fluid communication with the pre-chamber assembly 207 along a flow path that does not include the main combustion chamber 208.

A main fuel injector 254 may be disposed in fluid communication with the intake duct 212 upstream of the intake valve 214, or alternatively, the main fuel injector 254 may be disposed in direct fluid communication with the main combustion chamber 208. Accordingly, the main fuel injector 254 may be in fluid communication with the main combustion chamber 208 via a flow path that does not include the pre-chamber assembly 207. The pre-chamber fuel valve 253 and the main fuel injector 254 may each be operatively coupled to the controller 110, such that the controller 110 is configured to selectively effect fluid communication between the fuel supply system 250 and the pre-chamber assembly 207 and the main combustion chamber 208 via the pre-chamber fuel valve 253 and the main fuel injector 254, respectively.

The fuel supply system 250 may include sources of different combustible fuels. According to one aspect of the disclosure, the fuel supply system 250 is configured to provide a first fuel to the pre-chamber assembly 207, and a second fuel to the main combustion chamber 208, where the first fuel differs from the second fuel in at least one of supply pressure, matter phase, and chemical composition. Alternatively, the fuel supply system 250 may be configured to deliver the same fuel to each of the pre-chamber assembly 207 and the main combustion chamber 208.

The fuel supply system 250 may be configured to deliver a liquid fuel, a gaseous fuel, or combinations thereof. Liquid fuels may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art. Gaseous fuels may include natural gas, methane, propane, hydrogen, carbon monoxide, biogas, syngas, combinations thereof, or any other combustible gas known in the art. It will be appreciated that a gaseous fuel may include inert constituents, such as carbon dioxide, nitrogen, steam, combinations thereof, or any other inert gas known in the art. According to an aspect of the disclosure, the fuel supply system 250 is configured to deliver natural gas. According to another aspect of the disclosure, the fuel supply system 250 is configured to deliver a combustible gas comprising at least 50% methane by mole. According to yet another aspect of the disclosure, the fuel supply system 250 is configured to deliver a fuel with a sufficiently low cetane value, or a sufficiently high octane value, for use in a spark-ignition reciprocating IC engine, such as natural gas or gasoline, for example.

The pre-chamber fuel valve 253 is configured to effect selective fluid communication between the fuel supply system 250 and the pre-chamber assembly 207. For example, the pre-chamber fuel valve 253 may assume one of the following two configurations. According to a first configuration, the pre-chamber fuel valve 253 blocks fluid communication between the fuel supply system 250 and the pre-chamber assembly 207 via the pre-chamber fuel conduit 252. According to a second configuration, the pre-chamber fuel valve 253 effects fluid communication between the fuel supply system 250 and the pre-chamber assembly 207 via the pre-chamber fuel conduit 252.

The pre-chamber fuel valve 253 may include an actuator 260 configured to change the fluid configuration of the pre-chamber fuel valve 253 under the control of the controller 110. The actuator for the pre-chamber fuel valve 253 may include a solenoid actuator, a servo-motor actuator, a hydraulic actuator, a pneumatic actuator, a mechanical actuator, such as, for example a cam actuator, combinations thereof, or any other valve actuator known in the art. The controller 110 may control an amount of fuel delivered to the pre-chamber assembly 207 via the pre-chamber fuel valve 253 by controlling an opening time duration of the pre-chamber fuel valve 253, an effective flow area of the pre-chamber fuel valve 253, or combinations thereof.

Similarly, the main fuel injector 254 is configured to effect selective fluid communication between the fuel supply system 250 and the main combustion chamber 208. For example, the main fuel injector 254 may assume one of the following two fluid configurations. According to a first configuration, the main fuel injector 254 blocks fluid communication between the fuel supply system 250 and the intake duct 212. According to a second configuration, the main fuel injector 254 effects fluid communication between the fuel supply system 250 and the intake duct 212.

The main fuel injector 254 may include an actuator configured to change the fluid configuration of the main fuel injector 254 under the control of the controller 110. The actuator for the main fuel injector 254 may include a solenoid actuator, a hydraulic actuator, a pneumatic actuator, a mechanical actuator, such as, for example a cam actuator, combinations thereof, or any other fuel injector actuator known in the art. The controller 110 may control an amount of fuel delivered to the main combustion chamber 208 via the main fuel injector 254 by controlling an opening time duration of the main fuel injector 254, an effective flow area of the main fuel injector 254, or combinations thereof.

The controller 110 may be in data communication with a user interface for receiving control inputs from an operator of the machine 100. Further, the controller 110 may be in data communication with the IC engine 104 via one or more data connections for receiving sensor signals from the IC engine 104, delivering control inputs to the IC engine 104, combinations thereof, or for transmitting any data known in the art to be relevant to operation of the IC engine 104. It will be appreciated that any data connections between the controller 110 and any other element of the IC engine 104 may include wired connections, wireless connections, combinations thereof, or any other data communication means known in the art.

The controller 110 may be any purpose-built processor for effecting control of the IC engine 104, the machine 100, or combinations thereof. It will be appreciated that the controller 110 may be embodied in a single housing, or a plurality of housings distributed throughout the machine 100. Further, the controller 110 may include power electronics, preprogrammed logic circuits, data processing circuits, volatile memory, non-volatile memory, software, firmware, combinations thereof, or any other controller structures known in the art.

The IC engine 104 may optionally include an in-cylinder sensor 266 that is in fluid communication with the main combustion chamber 208, optical communication with the main combustion chamber 208, acoustic communication with the main combustion chamber 208, or combinations thereof. Accordingly, the in-cylinder sensor may sense pressure within the main combustion chamber 208, light emission within the main combustion chamber 208, or both, and may do so at a frequency that is high enough to characterize stability of the combustion process within the main combustion chamber 208.

The in-cylinder sensor 266 may be operatively coupled to the controller 110, such that the in-cylinder sensor 266 may transmit time histories of pressure or light intensity to the controller 110. According to an aspect of the disclosure, the controller 110 is configured to identify an engine knocking or detonation condition based on data input from the in-cylinder sensor 266. According to another aspect of the disclosure, the controller 110 is configured to identify an engine misfiring or insufficient combustion intensity condition based on data input from the in-cylinder sensor 266.

Figure 3:
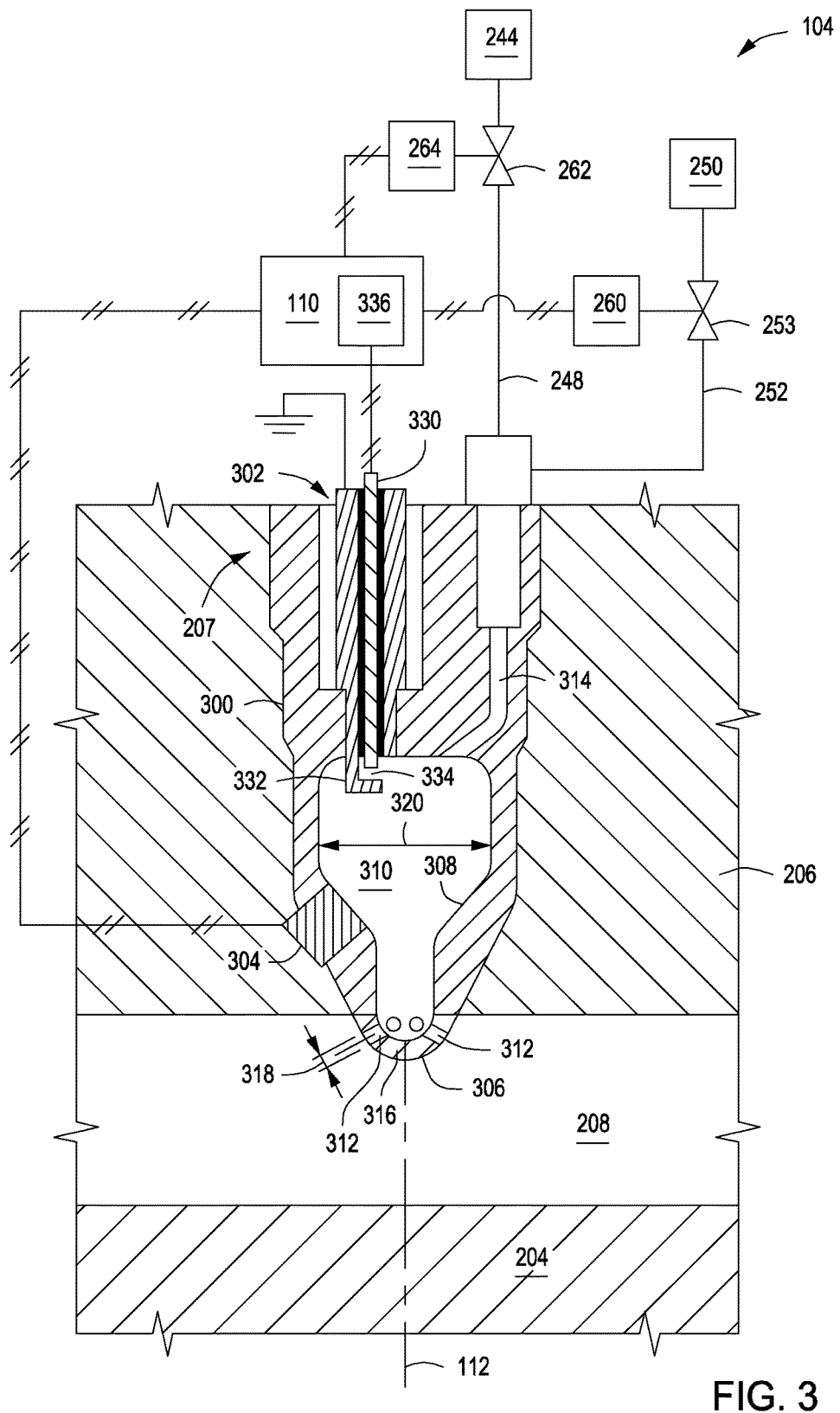
FIG. 3 shows a schematic cross-sectional view of a pre-chamber assembly installed in an IC engine, according to an aspect of the disclosure.

FIG. 3 is a schematic cross-sectional view of a pre-chamber assembly 207 installed in an IC engine 104, according to an aspect of the disclosure. The pre-chamber assembly 207 includes a body 300 and an ignition energy source 302. Optionally, the pre-chamber assembly 207 may include a heating element 304, the pre-chamber fuel valve 253, or both.

An external surface 306 of the pre-chamber assembly 207 at least partly defines the main combustion chamber 208. According to an aspect of the disclosure, the external surface 306 may project beyond the head 206 into the main combustion chamber 208. An internal surface 308 of the pre-chamber assembly 207 defines a combustion pre-chamber 310 and a plurality of outlet orifices 312, and optionally defines a pre-chamber fluid supply conduit 314.

The outlet orifices 312 extend through a wall 316 of the body 300 and effect fluid communication between the combustion pre-chamber 310 and the main combustion chamber 208. According to an aspect of the disclosure, a transverse dimension 318 of one or more of the outlet orifices 312 is less than 25% of a transverse dimension 320 of the combustion pre-chamber 310. According to another aspect of the disclosure, a transverse dimension 318 of one or more of the outlet orifices 312 is less than 15% of a transverse dimension 320 of the combustion pre-chamber 310. Accordingly, fluid flow from the combustion pre-chamber 310 to the main combustion chamber 208 via the plurality of outlet orifices 312 is accelerated by a reduction in flow area through the plurality of outlet orifices 312 to form fluid jets projecting into the main combustion chamber 208.

According to an aspect of the disclosure, the ignition energy source 302 is an electric spark plug including an anode 330 and a cathode 332. The anode 330 and the cathode 332 are electrically insulated from one another and define a spark gap 334 within the combustion pre-chamber 310. The cathode 332 may be electrically coupled to a chassis ground of the pre-chamber assembly 207, the engine 104, the machine 100, or combinations thereof. The anode 330 is electrically coupled to the controller 110 via a high voltage source 336, where the controller 110 is configured to effect application of a voltage difference across the spark gap 334 sufficient to cause an electric spark to arc across the spark gap 334. In turn, the electric spark across the spark gap 334 may be configured to effect a desired degree or intensity of chemical reactions between a fuel and an oxidizer disposed within the combustion pre-chamber 310.

Alternatively or additionally, the ignition energy source 302 may include a laser energy source optically coupled to the combustion pre-chamber 310. The laser energy source may be operatively coupled to the controller 110, and the controller 110 may be configured to cause the laser energy source to transmit a beam of laser light into the combustion pre-chamber 310 for effecting a desired degree or intensity of chemical reactions between a fuel and an oxidizer disposed within the combustion pre-chamber 310.

In addition to the ignition energy source 302, the pre-chamber assembly 207 may include a heating element 304 disposed in thermal communication with the combustion pre-chamber 310. According to an aspect of the disclosure, the heating element 304 is an electrical resistance heater that is operatively coupled to the controller 110, where the controller 110 is configured to effect a desired heat flux into the combustion pre-chamber 310, effect a desired temperature within the combustion pre-chamber 310, or both. The heating element 304 may be advantageously operated to promote medium temperature combustion kinetics, less than about 1340 degrees Fahrenheit (1000 K), without transitioning to sustained, higher temperature reactions capable of proceeding spontaneously to a complete reaction.

The pre-chamber EGR conduit 248 may be in selective fluid communication with the EGR loop 240 or the EGR conditioning module 244 via a pre-chamber EGR valve 262. Accordingly, the pre-chamber EGR valve 262 is configured to effect selective fluid communication between the EGR loop 240 and the pre-chamber assembly 207 via the pre-chamber EGR conduit 248. For example, the pre-chamber EGR valve 262 may assume one of the following two fluid configurations. According to a first configuration, the pre-chamber EGR valve 262 blocks fluid communication between the EGR loop 240 and the pre-chamber assembly 207. According to a second configuration, the pre-chamber EGR valve 262 effects fluid communication between the EGR loop 240 and the pre-chamber assembly 207.

The pre-chamber EGR valve 262 may include an actuator 264 configured to change the fluid configuration of the pre-chamber EGR valve 262 under the control of the controller 110. The actuator 264 for the pre-chamber EGR valve 262 may include a solenoid actuator, a servo-motor actuator, a hydraulic actuator, a pneumatic actuator, a mechanical actuator, such as, for example a cam actuator, combinations thereof, or any other valve actuator known in the art. The controller 110 may control an amount of exhaust gas delivered to the pre-chamber assembly 207 via the pre-chamber EGR valve 262 by controlling an opening time duration of the pre-chamber EGR valve 262, an effective flow area of the pre-chamber EGR valve 262, or combinations thereof.

The internal surface 308 of the body 300 may define a pre-chamber fluid supply conduit 314 that is in fluid communication with the combustion pre-chamber 310 and the pre-chamber fuel valve 253, the pre-chamber EGR valve 262, or both. Accordingly, the pre-chamber fuel valve 253 may effect selective fluid communication between the fuel supply system 250 and the combustion pre-chamber 310 via the pre-chamber fluid supply conduit 314, and the pre-chamber EGR valve 262 may effect selective fluid communication between the EGR loop 240 and the combustion pre-chamber 310 via the pre-chamber fluid supply conduit 314. Although FIG. 3 shows the pre-chamber fluid supply conduit 314 integrated within the body 300, it will be appreciated that the pre-chamber fluid supply conduit 314 could also be embodied as a separate conduit external to the body 300 and passing through the body 300 to effect fluid communication with the combustion pre-chamber 310.

Although FIG. 3 shows each of the pre-chamber fuel valve 253 and the pre-chamber EGR valve 262 each fluidly coupled to a single pre-chamber fluid supply conduit 314, it will be appreciated that the pre-chamber fuel valve 253 and the pre-chamber EGR valve 262 may each be fluidly coupled to the combustion pre-chamber 310 through separate fluid conduits arranged fluidly in parallel with one another.

INDUSTRIAL APPLICABILITY

The present disclosure is applicable to spark ignition IC engines in general, and in particular to a combustion pre-chamber for an internal combustion engine and a method for operating the same.

Operation of an IC engine 104 will now be described with reference to FIGS. 2 and 3. Near TDC of an intake stroke, the exhaust valves 218 close and the intake valves 214 open. As the piston 204 translates within the bore 202 toward BDC, oxidizer from the intake duct 212 and fuel from the main fuel injector 254 are drawn into the main combustion chamber 208. It will be appreciated that the main fuel injector 254 may admit fuel into the main combustion chamber 208 over a period of time spanning only a portion of the entire intake stroke. Fuel, oxidizer, or both, from the main combustion chamber 208 may flow into the combustion pre-chamber 310 via the outlet orifices 312 during the intake stroke by diffusion, convection driven by charge motion within the main combustion chamber 208, or other mass transport process.

Near BDC of a following compression stroke, the intake valves 214 close and the exhaust valves 218 remain closed. As the piston 204 translates within the bore 202 toward TDC, oxidizer and fuel from the main fuel injector 254 are mixed and compressed within the main combustion chamber 208. Further, compression within the main combustion chamber 208 causes a flow of oxidizer and fuel from the main fuel injector 254 to flow from the main combustion chamber 208 into the combustion pre-chamber 310 via the plurality of outlet orifices 312. According to an aspect of the disclosure, the only source of oxidizer for the combustion pre-chamber 310 is oxidizer originating from the intake duct 212 and flowing into the combustion pre-chamber 310 via the plurality of outlet orifices 312.

The relative proportions of fuel and oxidizer entering the combustion pre-chamber 310 via the plurality of outlet orifices 312 at any given time during the compression stroke may depend upon timing and flow rate of fuel from the main fuel injector 254, how well the fuel and the oxidizer are mixed within the main combustion chamber 208, or both. Thus, the relative proportions of fuel and oxidizer within the combustion pre-chamber 310 during the compression stroke may vary with time.

Optionally, fuel may be delivered directly to the combustion pre-chamber 310 via the pre-chamber fuel valve 253 and the pre-chamber fluid supply conduit 314 during the intake stroke, the compression stroke, or both. Accordingly, a concentration of fuel in the fuel-oxidizer mixture disposed within the combustion pre-chamber 310 may be affected by residual gas remaining in the combustion pre-chamber 310 after the previous exhaust stroke, oxidizer flowing from the main combustion chamber 208 into the combustion pre-chamber 310, fuel flowing from the main combustion chamber 208 into the combustion pre-chamber 310, and fuel flowing from the pre-chamber fuel valve 253 directly into the combustion pre-chamber 310. The pre-chamber fuel valve 253 may deliver fuel directly to the combustion pre-chamber 310 over any time period between about 500 degrees crank angle before TDC of the compression stroke and about the time of closing the intake valves 214, for example. Alternatively or additionally, given a fuel supply with sufficient supply pressure, the pre-chamber fuel valve 253 may deliver fuel directly to the combustion pre-chamber 310 over any time period between about the time of exhaust valves 218 closing near the end of the exhaust stroke and about TDC of the compression stroke.

Optionally, exhaust gas may be delivered directly to the combustion pre-chamber 310 via the pre-chamber EGR valve 262 and the pre-chamber fluid supply conduit 314 during the intake stroke, the compression stroke, or both. Accordingly, a concentration of fuel in the fuel-oxidizer mixture disposed within the combustion pre-chamber 310 may be affected by residual gas remaining in the combustion pre-chamber 310 after the previous exhaust stroke, oxidizer flowing from the main combustion chamber 208 into the combustion pre-chamber 310, fuel flowing from the main combustion chamber 208 into the combustion pre-chamber 310, and fuel flowing from the pre-chamber fuel valve 253 directly into the combustion pre-chamber 310, and exhaust gas flowing from the EGR loop 140 directly into the combustion pre-chamber 310 via the pre-chamber EGR valve 262.

The pre-chamber EGR valve 262 may deliver exhaust gas directly to the combustion pre-chamber 310 over any time period between about 500 degrees crank angle before TDC of the compression stroke and about the time of closing the intake valves 214, for example. Alternatively or additionally, given an EGR supply with sufficient supply pressure, the pre-chamber EGR valve 262 may deliver exhaust gas directly to the combustion pre-chamber 310 over a portion of the compression stroke.

An operator of an IC engine 104 may wish to control nitrogen oxides (NOx) emitted from the IC engine 104. One strategy for controlling NOx emissions is to reduce the kinetic rate of NOx formation within the IC engine 104 by lowering peak temperatures within the main combustion chamber 208 during a combustion event. Peak in-cylinder temperatures may be reduced by reducing the overall concentration of fuel in the fuel-oxidizer mixture burned in the main combustion chamber 208 to a value less than the stoichiometric ratio of fuel quantity to oxidizer quantity within the main combustion chamber 208.

Unless specified otherwise, the stoichiometric ratio of fuel to oxidizer is the theoretical proportion of fuel quantity to oxidizer quantity that results in no excess fuel and no excess oxidizer upon complete combustion of the mixture. Or in other words, the stoichiometric ratio of fuel to oxidizer is the proportion of fuel quantity to oxidizer quantity that results in all fuel and all oxygen being consumed upon complete combustion of the mixture. The stoichiometric ratio of fuel to oxidizer may be calculated on either a molar or mass basis.

An actual fuel-to-oxidizer ratio may be normalized by the stoichiometric fuel-to-oxidizer ratio to yield an equivalence ratio. As used herein, and unless specified otherwise, a mixture having an equivalence ratio less than one is fuel lean and will result in excess oxygen and no unburned fuel upon complete combustion, and a mixture having an equivalence ratio greater than one is fuel rich and will result in unburned fuel and no excess oxygen upon complete combustion. Thus, the exhaust from fuel lean combustion of a hydrocarbon fuel may contain both excess oxygen and water formed from combustion of the hydrocarbon fuel, as well as carbon dioxide and other combustion products known in the art.

While decreasing the equivalence ratio of an already fuel lean mixture tends to reduce the amount of NOx formed, leaner equivalence ratios may pose ignition challenges. For example, in spark ignition engines, leaner fuel-oxidizer mixtures may require higher ignition energy to ignite a self-sustaining flame front, may result in lower flame speeds through the fuel-oxidizer mixture, or both. Further, the challenges of igniting lean fuel-oxidizer mixtures may be compounded in spark ignition engines having large diameter pistons because the flame has to propagate a long distance from the point of ignition to the cylinder bore 202 over the relatively short time duration of an expansion stroke. Failure to ignite and burn all of the fuel-oxidizer mixture in the main combustion chamber 208 results in higher unburned fuel at the end of the power stroke, which may necessitate exhaust aftertreatment to convert the unburned fuel downstream of the exhaust valves 218, and which tends to decrease fuel efficiency.

Combustion pre-chambers are known for, in effect, amplifying the ignition energy of a spark by igniting a small mixture of fuel and oxidizer within the pre-chamber and delivering jets of combustion products from the pre-chamber out into a main combustion chamber. According to an aspect of the disclosure, fuel delivered to the combustion pre-chamber 310 is less than about 3% of the total fuel delivered to the main combustion chamber 208 during the same cycle.

Some conventional approaches to operating combustion pre-chambers involve targeting a mixture within the pre-chamber that is close to stoichiometric. However, as lower NOx emissions are targeted, NOx generation within the pre-chamber may present a significant contribution to overall in-cylinder NOx formation, even though the amount of fuel burned in the combustion pre-chamber 310 is relatively small. Further, the high flame temperatures resulting from stoichiometric operation of a pre-chamber may reduce the useful life of the pre-chamber.

Alternatively, operating conventional pre-chambers with a lean fuel-oxidizer mixture may help to reduce NOx formation in the pre-chamber, but may pose too much compromise to the efficacy of the pre-chamber as an ignition source for the main combustion chamber. However, Applicant discovered advantageous structures and methods for effecting partial combustion of rich fuel-oxidizer mixtures early in the compression stroke to generate beneficial intermediate species, such as diatomic hydrogen (H2), carbon monoxide (CO), hydroxyl (OH) or combinations thereof, which enabled subsequent robust ignition of the pre-chamber mixture diluted to a leaner fuel-oxidizer ratio but still containing the previously formed intermediate species.

Applicant further discovered that delivering a flow of exhaust gas directly to the combustion pre-chamber 310 via a path that does not include the main combustion chamber 208 may act to further promote formation of the aforementioned beneficial species by promoting additional reaction pathways to CO and H2, including, but not limited to, steam-methane reforming, carbon dioxide (CO2) reforming, and partial oxidation reforming. Exemplary reactions for steam-methane reforming, CO2 reforming, and partial oxidation reforming, are included below in Reaction 1, Reaction 2, and Reaction 3, respectively.

$$CH4+H2O \rightarrow CO+3H2 \qquad \text{Reaction 1}$$

$$CH4+CO2 \rightarrow 2CO+2H2 \qquad \text{Reaction 2}$$

$$CH4+1/2O2 \rightarrow CO+2H2 \qquad \text{Reaction 3}$$

Accordingly, exhaust gas delivered directly to the combustion pre-chamber 310 via the pre-chamber EGR valve 262 may promote generation of CO and H2 via operation of the ignition energy source 302 by promoting concentrations of reactants, such as H2O, O2, and CO2, within the combustion pre-chamber 310 before operation of the ignition energy source 302. According to an aspect of the disclosure, the controller 110 is configured to effect an EGR fraction within the combustion pre-chamber 310 ranging from about 5% to about 25% by mass, to promote generation of the beneficial species within the combustion pre-chamber 310. According to another aspect of the disclosure, the controller 110 is configured to effect an EGR fraction within the combustion pre-chamber 310 ranging from about 7.5% to about 15% by mass. However, it will be appreciated that other EGR fractions may be employed to suit the needs of other applications. Unless specified otherwise, EGR fraction is defined herein as a ratio of fluid in the combustion pre-chamber 310 originating from the EGR loop 140 divided by the total amount of fluid within the combustion pre-chamber 310, including the fluid originating from the EGR loop 140.

In addition to promoting the aforementioned beneficial species within the combustion pre-chamber 310, exhaust flow into the combustion pre-chamber 310 may advantageously act to reduce NOx generation within the combustion pre-chamber 310 by inert dilution of the mixture within the combustion pre-chamber with CO2, nitrogen, or other inert diluent known in the art. It will be appreciated that the exhaust flow into the combustion pre-chamber 310 via the pre-chamber EGR valve 262 may include some oxidizer in addition to inert constituents, especially when the engine 104 is operated under fuel lean conditions.

Figure 4A:
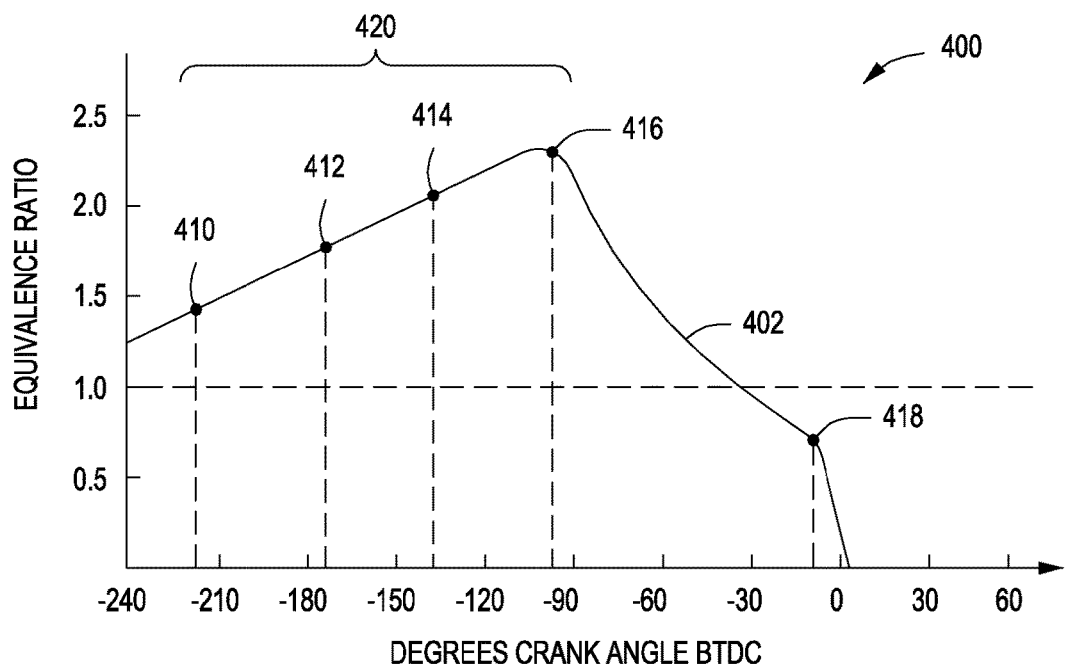
FIG. 4A shows a time trace of combustion pre-chamber equivalence ratio versus time, according to an aspect of the disclosure.
Figure 4B:
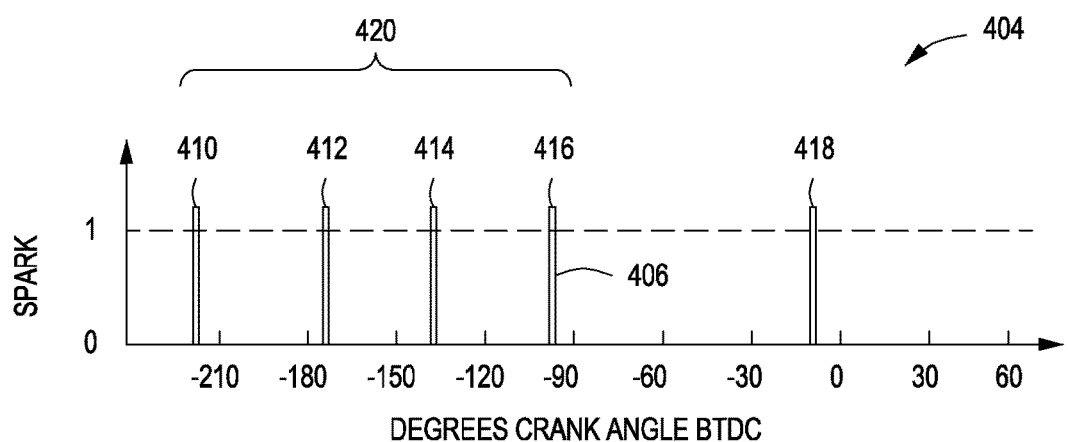
FIG. 4B shows a time trace of ignition energy pulses versus time, according to an aspect of the disclosure

FIG. 4A shows a time trace 400 of combustion pre-chamber 310 equivalence ratio 402 versus time, and FIG. 4B shows a time trace 404 of ignition energy pulses 406 versus time, according to an aspect of the disclosure. As shown in FIG. 4A, the equivalence ratio 402 within the combustion pre-chamber 310 is maintained above a value of one, i.e., fuel rich, from before the beginning of the compression stroke (180 degrees crank angle before TDC) through much of the compression stroke, before decreasing to less than one, i.e., a fuel lean condition. Unless specified otherwise, reference to an equivalence ratio for a specified volume herein refers to a bulk average equivalence ratio integrated over the specified volume. Therefore, references to a mixture of fuel and oxidizer does not require perfect mixing between the fuel and the oxidizer, but an equivalence ratio may be defined for the volume assuming perfect mixing of the fuel with the oxidizer disposed therein.

Referring to FIG. 4B, timing for a plurality of energy pulses is illustrated as a function of time, where the time coordinates for FIGS. 4A and 4B are aligned. As shown in FIG. 4B, a spark occurs when the energy pulse trace 406 is greater than or equal to a value of one, and there is no energy pulse when the energy pulse trace 406 is less than the value of one. Thus, the plurality of energy pulses illustrated in FIG. 4B includes at least five energy pulses, namely first pulse 410, second pulse 412, third pulse 414, fourth pulse 416, and fifth pulse 418. As discussed previously, it will be appreciated that any energy pulse of the plurality of energy pulses could be a spark arcing across the spark gap 334 of a spark plug, a pulse of laser light, or any other ignition energy pulse known in the art. According to an aspect of the disclosure, a duration of each energy pulse of the plurality of energy pulses is less than five (5) degrees crank angle. According to another aspect of the disclosure, an energy for each ignition spark is less than about 100 mJ.

The plurality of energy pulses 406 includes one or more preliminary energy pulses 420 that occur before a final energy pulse. As illustrated in FIGS. 4A and 4B the one or more energy pulses 420 includes pulse 410, pulse 412, pulse 414, and pulse 416, and the fifth pulse 418 is the final energy pulse. According to an aspect of the disclosure, none of the preliminary energy pulses 420 are sufficient to cause a sustained reaction of the fuel-oxidizer mixture within the combustion pre-chamber 310 to completion. The lack of a sustained reaction in response to the preliminary energy pulses 420 results at least in part from the rich mixture fractions during each energy pulse of the preliminary energy pulses 420. Further, operation of the pre-chamber assembly 207 by the controller 110, according to aspects of the disclosure, maintains fluid temperatures within the combustion pre-chamber 310 but outside the immediate influence of the at least one preliminary energy pulse 420 (see FIG. 4B) less than about 1160 degrees Fahrenheit (900 K) to advantageously promote medium-temperature combustion within the combustion pre-chamber 310 while avoiding higher temperature reactions that may produce a sustained reaction to complete combustion of the fuel and oxidizer.

By contrast, the final energy pulse 418 is sufficient to effect a sustained reaction resulting in complete combustion of the fuel-oxidizer mixture within the combustion pre-chamber 310. Unless specified otherwise herein, a sustained reaction within a fuel-oxidizer mixture is a reaction that proceeds to a reaction progress greater than 95% of a complete reaction, where at least 95% of the fuel is consumed, at least 95% of the oxygen is consumed, or both. According to an aspect of the disclosure, the final energy pulse is the first energy pulse in the plurality of energy pulses that is sufficient to cause a sustained reaction to completion. Thus, according to the definition for a final energy pulse used herein, subsequent energy pulses may follow "the final energy pulse."

Instead of causing a sustained reaction to completion, each of the preliminary energy pulses 420 causes a partial reaction of the fuel and the oxidizer disposed within the combustion pre-chamber 310 that subsequently quenches or ceases before proceeding to a complete reaction. In turn, chemical reactions caused by each of the preliminary energy pulses 420 advantageously result in intermediate combustion species that remain in the combustion pre-chamber 310 until the final energy pulse 418, which effects a sustained reaction to completion.

These intermediate combustion species may advantageously include H2, CO, or other intermediate species that promotes complete combustion of the mixture upon application of the final energy pulse. Further, H2 generated within the combustion pre-chamber 310 may be transported into the main combustion chamber 208 by diffusion or convection, for example, before the final energy pulse 418 and therefore enable reactions within the main combustion chamber 208 at a lower temperature than possible absent transport of H2 from the combustion pre-chamber 310 to the main combustion chamber 208. For example, increased H2 concentrations in the main combustion chamber 208 may promote reactions at temperatures about 260 Fahrenheit (400 K) lower, thereby promoting complete combustion while suppressing NOx formation.

Adding exhaust gas to the combustion pre-chamber 310 via the pre-chamber EGR valve 262 may sufficiently promote generation of H2 and CO within the combustion pre-chamber 310 that the amount of fuel delivered to the combustion pre-chamber 310 via the pre-chamber fuel valve 253 may be reduced without compromising effectiveness of the pre-chamber assembly 207 as an ignition source for the main combustion chamber 208, thereby promoting fuel efficiency of the IC engine 104.

According to an aspect of the disclosure, the controller 110 is configured to time each energy pulse of the one or more energy pulses 420 to occur while the equivalence ratio in the combustion pre-chamber 310 is greater than one. According to another aspect of the disclosure, the controller 110 is configured to time each energy pulse of the one or more energy pulses 420 to occur while the equivalence ratio in the combustion pre-chamber 310 is greater than one, and time the final energy pulse to occur while the equivalence ratio in the combustion pre-chamber 310 is less than one.

According to an aspect of the disclosure, the controller 110 is configured to time the one or more energy pulses 420 such that a reaction progress from before the first energy pulse to just before the final energy pulse is less than 50% of a complete reaction of the fuel and the oxidizer disposed within the combustion pre-chamber 310. According to another aspect of the disclosure, the controller 110 is configured to time the one or more energy pulses 420 such that a reaction progress from before the first energy pulse to just before the final energy pulse is less than 30% of a complete reaction of the fuel and the oxidizer disposed within the combustion pre-chamber 310.

According to an aspect of the disclosure, each energy pulse of the one or more preliminary energy pulses 420 occurs before 50 degrees crank angle before TDC of the piston on a compression stroke. According to another aspect of the disclosure, each energy pulse of the one or more energy pulses occurs before 80 degrees crank angle before TDC of the piston on a compression stroke. According to yet another aspect of the disclosure, a time duration between one preliminary energy pulse and an adjacent preliminary energy pulse is greater than 30 degrees crank angle. According to still yet another aspect of the disclosure, a time duration between one preliminary energy pulse and another preliminary energy pulse is less than 100 degrees crank angle.

According to an aspect of the disclosure, the controller 110 is configured to time the final energy pulse 418 for no earlier than 30 degrees crank angle before TDC of the piston on a compression stroke. According to another aspect of the disclosure, the controller 110 is configured to time the final energy pulse 418 for no earlier than 20 degrees crank angle before TDC of the piston on a compression stroke.

Figure 4C:
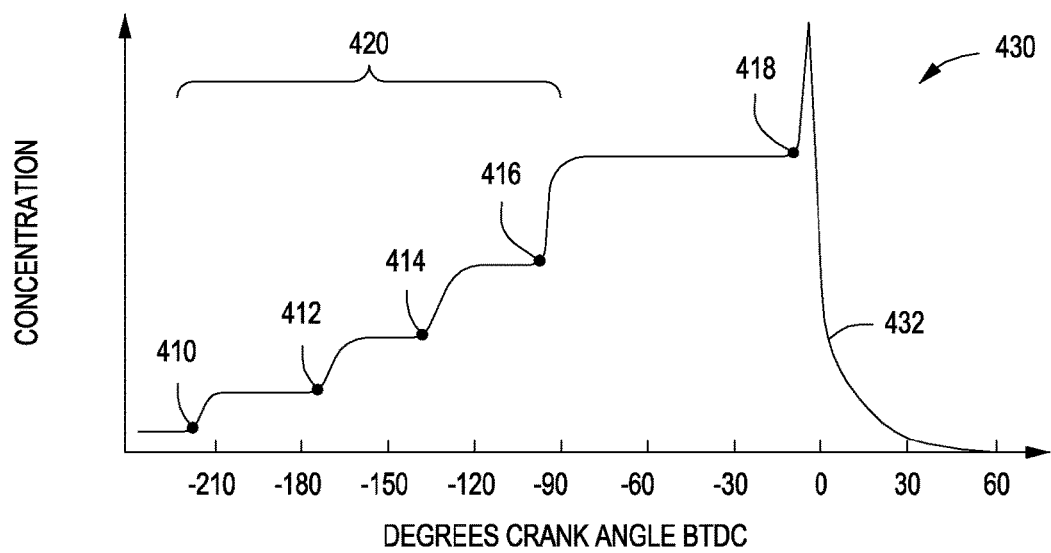
FIG. 4C shows a time trace of a concentration of a combustion intermediate species, according to an aspect of the disclosure.

Although the non-limiting aspects illustrated in FIGS. 4A-4C show four preliminary energy pulses 420, it will be appreciated that any number of preliminary energy pulses 420 greater than or equal to one may be employed to meet a particular need or design constraint.

FIG. 4C shows a time trace 430 of a concentration 432 of a combustion intermediate species, according to an aspect of the disclosure, with a time coordinate aligned with both FIGS. 4A and 4B. According to an aspect of the disclosure, the concentration profile 432 is an H2 concentration profile. According to another aspect of the disclosure, the concentration profile 432 is a CO concentration profile. However, it will be appreciated that the concentration profile 432 may be indicative of other combustion intermediate species. Unless specified otherwise, reference to a species concentration for a specified volume refers to a bulk average concentration integrated over the specified volume, which may correspond to a perfectly mixed concentration, even if fluid in the specified volume is not perfectly mixed.

As shown in FIG. 4C, a concentration immediately preceding each energy pulse of the preliminary energy pulses 420 is less than a concentration immediately preceding an adjacent and subsequent energy pulse. Following the final energy pulse 418, the concentration may abruptly increase before abruptly decreasing as a sustained reaction proceeds to completion in response to the final energy pulse 418. According to an aspect of the disclosure, concentrations of H2, CO, or both, resulting from the preliminary energy pulses 420 ranges from about 30-50% of the peak H2 or CO concentrations, respectively, resulting from sustained combustion toward a complete reaction after the final energy pulse 418. According to another aspect of the disclosure, a bulk average temperature within the combustion pre-chamber 310 is maintained below about 1340 degrees Fahrenheit (1000 K) prior to the final energy pulse 418, thereby limiting reactions to slower kinetic rates compared to the faster kinetic rates resulting from the higher temperatures generated by sustained combustion toward a complete reaction.

According to an aspect of the disclosure, CO concentrations within the combustion pre-chamber 310, prior to the final energy pulse 418, range from about 500 ppm to about 5000 ppm by mass. According to another aspect of the disclosure, H2 concentrations within the combustion pre-chamber 310, prior to the final energy pulse 418, range from about 100 ppm to about 500 ppm by mass.

Accordingly, by providing apparatus and methods for effecting partial, low-temperature combustion within a combustion pre-chamber 310 using a plurality of energy pulses, a robust ignition source is provided to the main combustion chamber 208 while simultaneously reducing NOx emissions generated within the combustion pre-chamber 310 and extending the useful life of the pre-chamber assembly 207. Further, aspects of the disclosure advantageously provide a method for producing combustion intermediate species, such as H2 or CO, within the pre-chamber assembly 207, absent an external gas reformer to provide the combustion intermediate species to the pre-chamber assembly 207.

Figure 5:
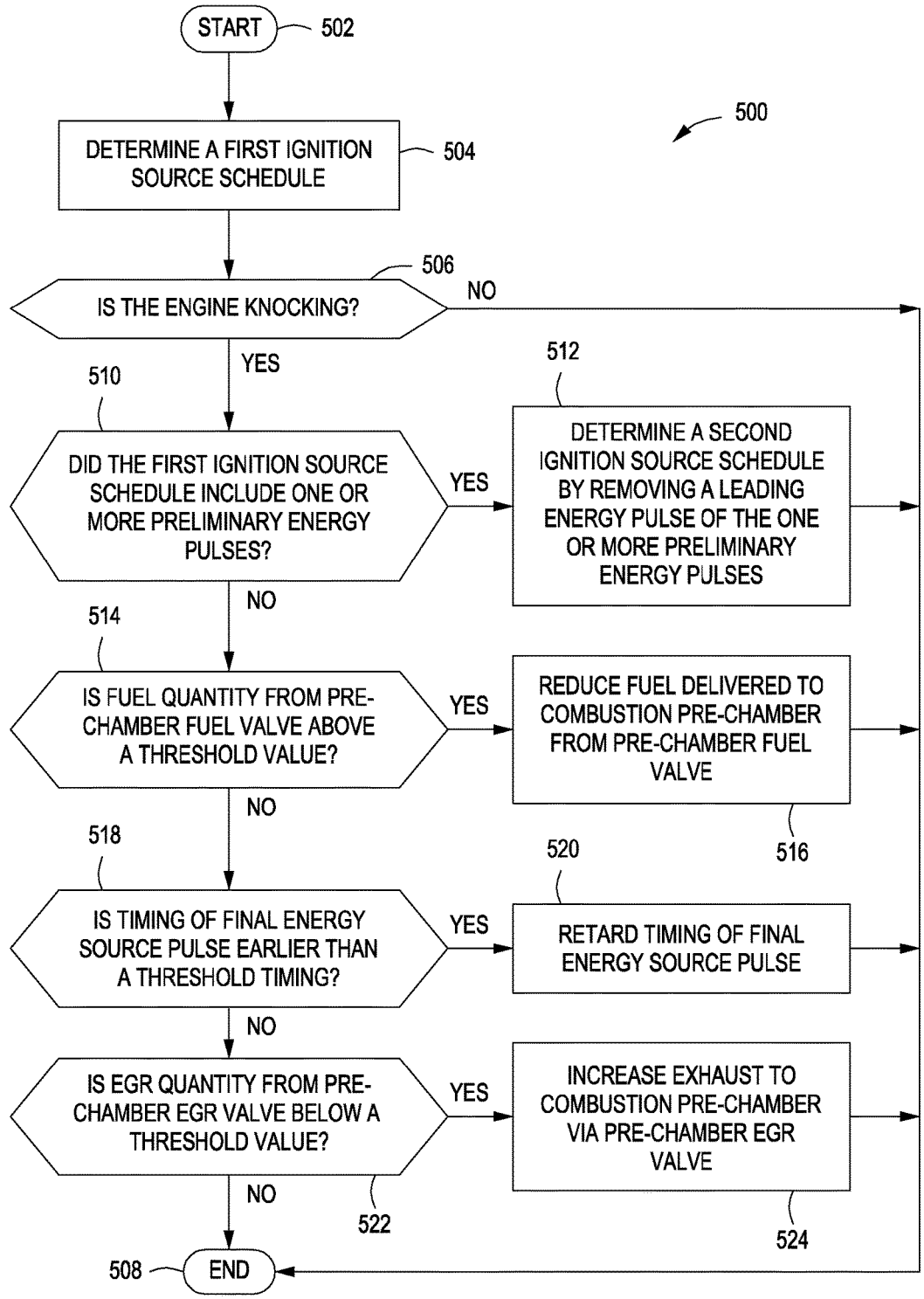
FIG. 5 shows a flowchart of a method for operating an IC engine, according to an aspect of the disclosure.

FIG. 5 shows a flowchart of a method 500 for operating an IC engine 104, according to an aspect of the disclosure. From the Start 502 the method 500 proceeds to Step 504 where a first ignition source schedule is determined. Then in Step 506, the method 500 determines whether the IC engine 104 is knocking or detonating. As discussed previously, a knocking or detonation condition may be determined by the controller 110 based on a signal from the in-cylinder sensor 266. However, a knocking or detonation condition may be determined in Step 506 by any structures or methods known in the art. If the IC engine 104 is not in a knocking or detonation condition, then the method 500 proceeds to the End 508.

If the IC engine 104 is in a knocking or detonation condition, then the method 500 proceeds to Step 510, where it is determined whether the first ignition source schedule includes any preliminary energy pulses 420. If the first ignition source schedule includes at least one preliminary energy pulse 420, then in Step 512, a second ignition source schedule is determined by removing a leading or earliest energy pulse from the at least one preliminary energy pulses 420, and the method 500 proceeds to the End 508.

If the first ignition source schedule does not include at least one preliminary energy pulse 420, then the method 500 proceeds to Step 514, where it is determined whether a fuel quantity from the pre-chamber fuel valve 253 is above a threshold value. The fuel quantity from the pre-chamber fuel valve 253 may be a flow rate of fuel, or a total quantity of fuel admitted to the combustion pre-chamber 310 via the pre-chamber fuel valve 253 during one piston cycle, for example. According to an aspect of the disclosure, the threshold value in Step 514 is zero; however, it will be appreciated that other threshold values may be selected to suit other applications. If the fuel quantity from the pre-chamber fuel valve 253 is greater than the threshold value, then in Step 516, the fuel delivered to the combustion pre-chamber 310 via the pre-chamber fuel valve 253 is reduced, and the method 500 proceeds to the End 508.

If the fuel quantity from the pre-chamber fuel valve 253 is not greater than the threshold value, then the method 500 proceeds to Step 518, where it is determined whether a timing of the final energy pulse 418, in the first ignition source schedule, is earlier than a threshold timing. The threshold timing value in Step 518 may be zero degrees before TDC of the compression stroke, for example. However, it will be appreciated that other values of the threshold timing in Step 518 may be applied to suit other applications. If the timing of the final energy pulse 418 is earlier than the threshold timing, then in Step 520, a timing of the final energy pulse 418 is retarded, and the method 500 proceeds to the End 508.

If the timing of the final energy pulse 418 is not earlier than the threshold timing, then the method 500 proceeds to Step 522, where it is determined whether an EGR quantity from the pre-chamber EGR valve 262 is less than a threshold value. The threshold value in Step 522 may be an EGR flow rate through the pre-chamber EGR valve 262 or an amount of EGR received in the combustion pre-chamber 310 via the pre-chamber EGR valve 262 during one piston cycle, for example. According to an aspect of the disclosure, the threshold value in Step 522 may be an upper limit value determined to promote combustion stability, fuel efficiency, emissions control, hardware life, combinations thereof, or any other considerations known in the art to be relevant with respect to selecting an amount of pre-chamber EGR.

If the EGR quantity from the pre-chamber EGR valve 262 is less than the threshold value, then in Step 524, exhaust to the combustion pre-chamber 310 via the pre-chamber EGR valve 262 is increased, and the method 500 proceeds to the End 508. And if the EGR quantity from the pre-chamber EGR valve 262 is not less than the threshold value, then the method 500 proceeds to the End 508.

Accordingly, the method 500 may detect a knocking or detonation condition in the IC engine 104 and determine control action to suppress the knocking or detonation condition. The method 500 may be partially or completely implemented by the controller 110.

Figure 6:
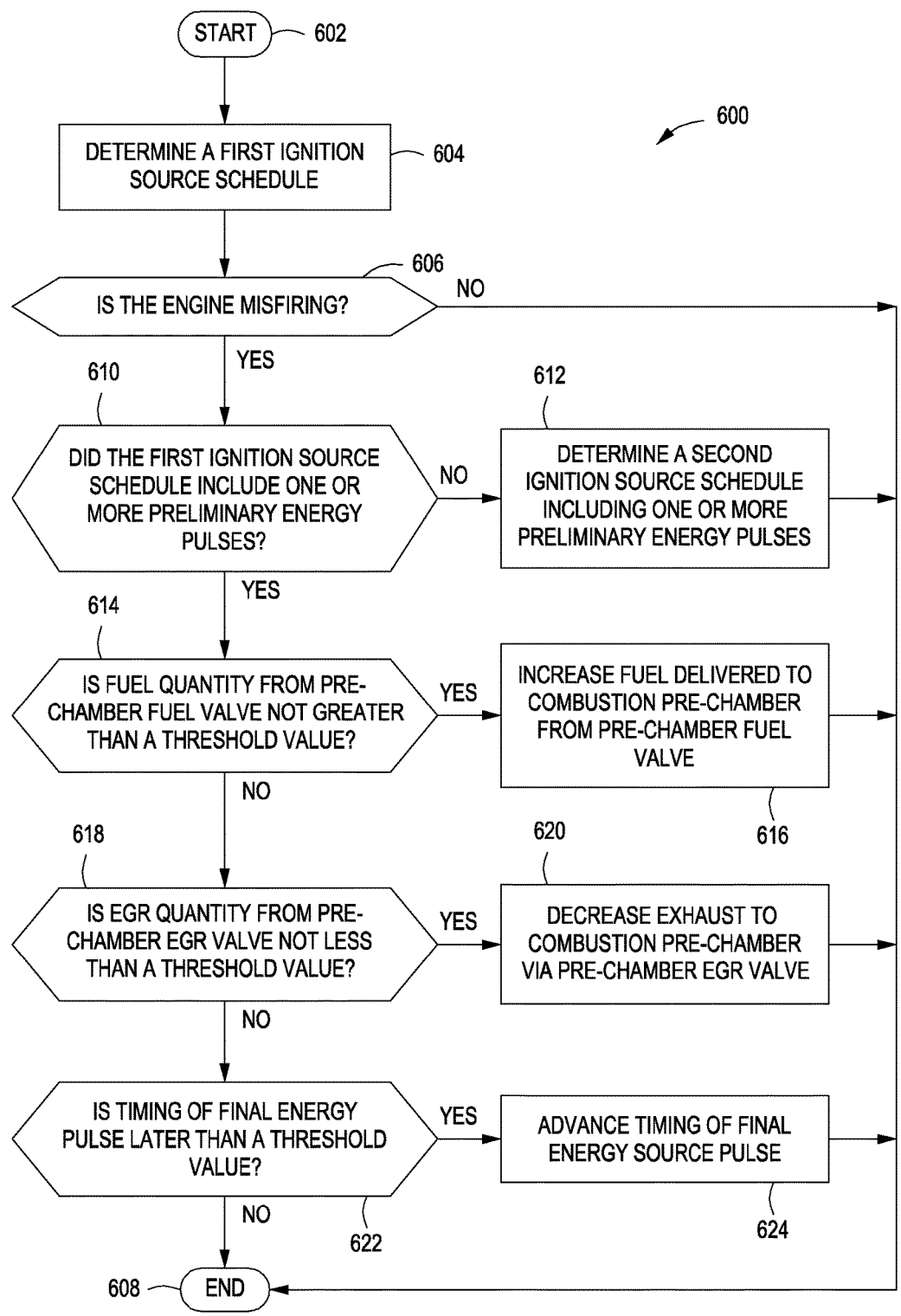
FIG. 6 shows a flowchart of a method for operating an IC engine, according to an aspect of the disclosure.

FIG. 6 shows a flowchart of a method 600 for operating an IC engine 104, according to an aspect of the disclosure. From the Start 602 the method 600 proceeds to Step 604 where a first ignition source schedule is determined. Then in Step 606, the method 600 determines whether the IC engine 104 is misfiring. As discussed previously, a misfiring condition may be determined by the controller 110 based on a signal from the in-cylinder sensor 266. However, a misfiring condition may be determined in Step 606 by any structures or methods known in the art. If the IC engine 104 is not in a misfiring condition, then the method 600 proceeds to the End 608.

If the IC engine 104 is in a misfiring condition, then the method 600 proceeds to Step 610, where it is determined whether the first ignition source schedule includes any preliminary energy pulses 420. If the first ignition source schedule does not include at least one preliminary energy pulse 420, then in Step 612, a second ignition source schedule is determined by adding at least one preliminary energy pulse 420, and the method 600 proceeds to the End 608.

If the first ignition source schedule already includes at least one preliminary energy pulse 420, then the method 600 proceeds to Step 614, where it is determined whether a fuel quantity from the pre-chamber fuel valve 253 is not greater than a threshold value. The fuel quantity from the pre-chamber fuel valve 253 may be a flow rate of fuel, or a total quantity of fuel admitted to the combustion pre-chamber 310 via the pre-chamber fuel valve 253 during one piston cycle, for example. According to an aspect of the disclosure, the threshold value in Step 614 is an upper limit value determined to promote combustion stability, fuel efficiency, emissions control, hardware life, combinations thereof, or any other considerations known in the art to be relevant with respect to selecting an amount of pre-chamber fueling. If the fuel quantity from the pre-chamber fuel valve 253 is not greater than the threshold value, then in Step 616, the fuel delivered to the combustion pre-chamber 310 via the pre-chamber fuel valve 253 is increased, and the method 600 proceeds to the End 608.

If the fuel quantity from the pre-chamber fuel valve 253 is greater than the threshold value, then the method 600 proceeds to Step 618, where it is determined whether an EGR quantity from the pre-chamber EGR valve 262 is not less than a threshold value. The threshold value in Step 618 may be an EGR flow rate through the pre-chamber EGR valve 262 or an amount of EGR received in the combustion pre-chamber 310 via the pre-chamber EGR valve 262 during one piston cycle, for example. According to an aspect of the disclosure, the threshold value in Step 618 may be a lower limit value determined to promote combustion stability, fuel efficiency, emissions control, hardware life, combinations thereof, or any other considerations known in the art to be relevant with respect to selecting a pre-chamber EGR fraction. If the EGR quantity from the pre-chamber EGR valve 262 is not less than the threshold value, then in Step 620, exhaust to the combustion pre-chamber 310 via the pre-chamber EGR valve 262 is decreased, and the method 600 proceeds to the End 608.

If the EGR quantity from the pre-chamber EGR valve 262 is less than the threshold value, then the method 600 proceeds to Step 622, where it is determined whether a timing of the final energy pulse 418, in the first ignition source schedule, is later than a threshold timing. The threshold timing value in Step 518 may be about 30 degrees before TDC of the compression stroke, for example. However, it will be appreciated that other values of the threshold timing in Step 518 may be applied to suit other applications.

If the timing of the final energy pulse 418 is later than the threshold timing, then in Step 624, a timing of the final energy pulse 418 is advanced, and the method 600 proceeds to the End 608. And if the timing of the final energy pulse 418 is not later than the threshold timing, then the method 600 proceeds to the End 608.

Accordingly, the method 600 may detect a misfiring condition in the IC engine 104 and determine control action to suppress the misfiring condition. The method 600 may be partially or completely implemented by the controller 110.

Any of the methods or functions described herein may be performed by or controlled by the controller 110. Further, any of the methods or functions described herein may be embodied in a machine-readable non-transitory medium for causing the controller 110 to perform the methods or functions described herein. Such machine-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An internal combustion engine, comprising:
   a pre-chamber assembly including a wall having an internal surface opposite an external surface, the internal surface of the wall defining a combustion pre-chamber and at least one orifice extending to an aperture through the external surface of the wall;
   a block having an internal surface defining a bore therein;
   a piston disposed within the bore and configured for reciprocal translation within the bore,
   the piston, the bore, and the external surface of the wall at least partly defining a main combustion chamber, and the combustion pre-chamber being in fluid communication with the main combustion chamber via the at least one orifice;
   an energy source operatively coupled to the combustion pre-chamber;
   an exhaust gas recirculation (EGR) valve fluidly coupled to the combustion pre-chamber and an exhaust conduit of the internal combustion engine; and
   a controller operatively coupled to the energy source and the EGR valve, the controller being configured to
   admit a flow of exhaust gas into the combustion pre-chamber along a flow path that does not include the main combustion chamber by actuating the EGR valve,
   effect a plurality of energy pulses from the energy source within the combustion pre-chamber during one cycle of the piston reciprocating within the bore, and
   increase a concentration of at least one of diatomic hydrogen (H2) and carbon monoxide (CO) within a mixture of a fuel and an oxidizer disposed within the combustion pre-chamber in response to a first energy pulse of the plurality of energy pulses.

2. The internal combustion engine of claim 1, wherein the controller is further configured to effect a reaction progress between the fuel and the oxidizer disposed within the combustion pre-chamber that is less than 50% of a complete reaction of the mixture of the fuel and the oxidizer during a time between a beginning of the first energy pulse and a beginning of a final energy pulse of the plurality of energy pulses, the final energy pulse occurring after the first energy pulse.

3. The internal combustion engine of claim 2, wherein no energy pulse before the final energy pulse is sufficient to ignite a sustained reaction of the mixture of the fuel and the oxidizer within the combustion pre-chamber to a reaction progress greater than 50% of a complete reaction.

4. The internal combustion engine of claim 1, wherein the energy source includes an electric spark plug.

5. The internal combustion engine of claim 2, wherein the plurality of energy pulses includes one or more preliminary energy pulses followed by the final energy pulse, the one or more preliminary energy pulses beginning with the first energy pulse, and
   wherein the controller is further configured to
   identify a knocking condition within the internal combustion engine, and
   remove at least one energy pulse from the one or more preliminary energy pulses in response to identifying the knocking condition.

6. The internal combustion engine of claim 5, wherein the controller is further configured to increase the flow of exhaust gas into the combustion pre-chamber in response to identifying the knocking condition.

7. The internal combustion engine of claim 2, wherein the controller is further configured to
   identify a misfiring condition within the internal combustion engine, and
   configure the plurality of energy pulses to include one or more preliminary energy pulses followed by the final energy pulse in response to identifying the misfiring condition, the one or more preliminary energy pulses beginning with the first energy pulse.

8. The internal combustion engine of claim 7, wherein the controller is further configured to decrease the flow of exhaust gas into the combustion pre-chamber in response to identifying the misfiring condition.

9. The internal combustion engine of claim 5, wherein the one or more preliminary energy pulses is insufficient to effect sustained combustion of the mixture of the fuel and the oxidizer within the combustion pre-chamber to a reaction progress greater than 50% of the complete reaction of the mixture of the fuel and the oxidizer within the combustion pre-chamber.

10. The internal combustion engine of claim 1, wherein the controller is further configured to effect selective fluid communication between a fuel source and the main combustion chamber via a first flowpath that does not include the combustion pre-chamber.

11. The internal combustion engine of claim 10, wherein the controller is further configured to effect selective fluid communication between the fuel source and the combustion pre-chamber via a second flowpath that does not include the main combustion chamber.

12. The internal combustion engine of claim 1, wherein the controller is further configured to effect at least one energy pulse of the plurality of energy pulses at a time when an equivalence ratio of the mixture of the fuel and the oxidizer in the combustion pre-chamber is not less than 1.1.

13. The internal combustion engine of claim 12, wherein the controller is further configured to effect the at least one energy pulse at a time when the equivalence ratio of the mixture of the fuel and the oxidizer in the combustion pre-chamber is not greater than 1.7.

14. A method for operating an internal combustion engine, the internal combustion engine including
   a pre-chamber assembly including a wall having an internal surface opposite an external surface, the internal surface of the wall defining a combustion pre-chamber and at least one orifice extending to an aperture through the external surface of the wall; and
   a piston disposed within a bore and configured for reciprocal translation within the bore,
   the piston, the bore, and the external surface of the wall at least partly defining a main combustion chamber, and the combustion pre-chamber being in fluid communication with the main combustion chamber via the at least one orifice,
   the method comprising:
   introducing a flow of exhaust gas into the combustion pre-chamber along a flow path that does not include the main combustion chamber;
   effecting a plurality of energy pulses within the combustion pre-chamber from an energy source during one cycle of the piston reciprocating within the bore; and
   increasing a concentration of at least one of diatomic hydrogen (H2) and carbon monoxide (CO) within a mixture of a fuel and an oxidizer disposed within the combustion pre-chamber in response to a first energy pulse of the plurality of energy pulses.

15. The method of claim 14, further comprising effecting a reaction progress between the fuel and the oxidizer disposed within the combustion pre-chamber that is less than 50% of a complete reaction of the mixture of the fuel and the oxidizer during a time between a beginning of the first energy pulse and a beginning of a final energy pulse of the plurality of energy pulses, the final energy pulse occurring after the first energy pulse.

16. The method of claim 15, further comprising:

identifying a knocking condition within the internal combustion engine, and removing at least one energy pulse from the plurality of energy pulses in response to identifying the knocking condition.

17. The method of claim 16, further comprising increasing the flow of exhaust gas into the combustion pre-chamber in response to the identifying the knocking condition.

18. The method of claim 15, further comprising:

identifying a misfiring condition within the internal combustion engine; and adding at least one preliminary energy pulse to the plurality of energy pulses in response to the identifying the misfiring condition.

19. The method of claim 18, further comprising decreasing the flow of exhaust gas into the combustion pre-chamber in response to the identifying the misfiring condition.

20. An article of manufacture comprising non-transitory machine-readable media encoding instructions thereon for causing a processor to:

deliver a flow of exhaust gas to a combustion pre-chamber along a flow path that does not include a main combustion chamber;

effect a plurality of energy pulses within the combustion pre-chamber of an internal combustion engine during one cycle of a piston reciprocating within a bore of the internal combustion engine; and increase a concentration of at least one of diatomic hydrogen (H2) and carbon monoxide (CO) within a mixture of a fuel and an oxidizer disposed within the combustion pre-chamber in response to a first energy pulse of the plurality of energy pulses.

* * * * *